United States Patent
Daya et al.

(10) Patent No.: US 10,409,830 B2
(45) Date of Patent: Sep. 10, 2019

(54) SYSTEM FOR FACET EXPANSION

(71) Applicant: Microsoft Technology Licensing, LLC, Redmond, WA (US)

(72) Inventors: Rahim Daya, San Francisco, CA (US); Abhishek Gupta, San Francisco, CA (US); Shakti Dhirendraji Sinha, Sunnyvale, CA (US); Xianren Wu, Santa Clara, CA (US); Satya Pradeep Kanduri, Mountain View, CA (US); Zian Yu, San Jose, CA (US); Shan Zhou, San Jose, CA (US); Jordan Anthony Saints, Sunnyvale, CA (US); Timothy Patrick Jordt, San Francisco, CA (US); Gregory Alan Walloch, Santa Cruz, CA (US); Zachary Tyler Piepmeyer, San Francisco, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 93 days.

(21) Appl. No.: 15/253,644

(22) Filed: Aug. 31, 2016

(65) Prior Publication Data
US 2017/0109412 A1 Apr. 20, 2017

Related U.S. Application Data

(60) Provisional application No. 62/241,405, filed on Oct. 14, 2015.

(51) Int. Cl.
*G06F 17/30* (2006.01)
*G06F 16/248* (2019.01)
(Continued)

(52) U.S. Cl.
CPC ...... *G06F 16/248* (2019.01); *G06F 16/24578* (2019.01); *G06F 16/3322* (2019.01); *G06F 16/9535* (2019.01)

(58) Field of Classification Search
None
See application file for complete search history.

(56) References Cited

U.S. PATENT DOCUMENTS

| | | | |
|---|---|---|---|
| 8,262,532 B2 * | 9/2012 | Aoiz Miguel | F16H 3/66 475/282 |
| 8,433,705 B1 * | 4/2013 | Dredze | G06F 16/3322 707/723 |

(Continued)

OTHER PUBLICATIONS

"International Application Serial No. PCT/US2016/056881, International Search Report dated Dec. 21, 2016", 4 pgs.

(Continued)

*Primary Examiner* — Debbie M Le
(74) *Attorney, Agent, or Firm* — Schwegman Lundberg & Woessner, P.A.

(57) ABSTRACT

System and techniques for facet expansion are described herein. A user interface element may be presented on facet selection portion of a search result display including search results. Here, the user interface element is arranged to accept user input of a facet. Partial user input for a facet may be received. A peer entity to an entity corresponding to the facet may be obtained. A peer facet may be presented in a suggestion element in the facet selection portion in response to receiving the partial user input.

15 Claims, 5 Drawing Sheets

(51) Int. Cl.
*G06F 16/9535* (2019.01)
*G06F 16/2457* (2019.01)
*G06F 16/332* (2019.01)

(56) References Cited

U.S. PATENT DOCUMENTS

| | | | |
|---|---|---|---|
| 9,251,279 B2* | 2/2016 | Mihalik | G06F 3/0482 |
| 9,262,532 B2 | 2/2016 | Pueyo et al. | |
| 9,336,314 B2* | 5/2016 | Lam | G06F 16/3326 |
| 9,360,982 B2* | 6/2016 | Emanuel | G06F 3/048 |
| 9,418,103 B2 | 8/2016 | Shapira et al. | |
| 9,519,716 B2 | 12/2016 | Athsani et al. | |
| 9,594,540 B1* | 3/2017 | Stasior | G06F 7/00 |
| 9,596,308 B2 | 3/2017 | Brezina et al. | |
| 9,710,556 B2* | 7/2017 | Koperski | G06F 17/30864 |
| 10,108,710 B2 | 10/2018 | Shurn et al. | |
| 2006/0294071 A1* | 12/2006 | Weare | G06F 17/30864 |
| 2009/0292674 A1 | 11/2009 | Dasdan et al. | |
| 2012/0203751 A1* | 8/2012 | Srivastava | G06F 17/30528 707/706 |
| 2012/0265746 A1 | 10/2012 | Srivastava et al. | |
| 2012/0265779 A1 | 10/2012 | Hsu et al. | |
| 2014/0129552 A1 | 5/2014 | Sinha et al. | |
| 2015/0039597 A1 | 2/2015 | Raina et al. | |
| 2015/0067502 A1 | 3/2015 | Yang et al. | |
| 2015/0205828 A1 | 7/2015 | Manciero et al. | |
| 2016/0026643 A1* | 1/2016 | Desai | G06F 17/3053 707/727 |
| 2016/0179933 A1* | 6/2016 | Dimassimo | G06F 17/241 707/711 |
| 2016/0210337 A1* | 7/2016 | Constandt | G06Q 10/10 |
| 2017/0109411 A1 | 4/2017 | Daya et al. | |
| 2017/0109445 A1 | 4/2017 | Daya et al. | |
| 2017/0242898 A1 | 8/2017 | Su et al. | |

OTHER PUBLICATIONS

"International Application Serial No. PCT/US2016/056881, Written Opinion dated Dec. 21, 2016", 12 pgs.
"Non Final Office Action Issued in U.S. Appl. No. 15/253,381", dated Jun. 14, 2018, 12 Pages.
"Non Final Office Action issued in U.S. Appl. No. 15/253,667", dated Jul. 12, 2018, 9 Pages.
"Final Office Action Issued in U.S. Appl. No. 15/253,381", dated Mar. 1, 2019, 15 Pages.
"Notice of Allowance Issued in U.S. Appl. No. 15/253,667", dated Apr. 24, 2019, 10 Pages.

* cited by examiner

SYSTEM FOR FACET EXPANSION

CLAIM OF PRIORITY

This patent application claims the benefit of priority, under 35 U.S.C. § 119, to U.S. Provisional Application Ser. No. 62/241,405, titled "SMART SEARCH FILTERS" and filed on Oct. 14, 2015, the entirety of which is hereby incorporated by reference herein.

TECHNICAL FIELD

Embodiments described herein generally relate to search engines and more specifically to facet expansion.

BACKGROUND

Search engines generally provide a structured mechanism to enter a request for data and match that request to items in a data store. These data store items generally include multiple fields that include data or references to other data. The data request is often structured with respect to a known field configuration of the data in the data store. Thus, queries are formulated that, for example, request title fields that include all or part of an article title.

After receiving a query, the search engine generally parses the query to determine when and where to search the data store, creating a query plan. The search engine then executes the query plan collecting results. These results, once located, may be further manipulated according to other parameters of the query. These manipulations may include sorting the results, aggregating results to produce a number, etc. The final result, following manipulations, is then returned to an agent to, for example, display the search results to a user. In some examples, the user may subsequent requests of the search engine for an already completed search to manipulate the search results further.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

Following a search, search results are displayed to the user. In some instances, the data may be too large, or otherwise unwieldly to answer specific questions by the user. However, the data in the search results contains the raw material to satisfy the user. In these instances facets may be used to allow further manipulation of the data in the search results without performing an additional search. Generally, a facet is an aspect of the records returned in the search results. Often, this aspect is presented as a selectable user interface element. Also, the selectable user interface element often includes a count of the items that have a particular facet. For example, if one where to search for "TV" on an electronics storefront, facets for the search results may include such things as "LCD," "OLED," or "GREATER THAN 50 INCHES." While every search result may not have one of these facets, some will. Selecting the facet arranges, or filters, the search results such that those with the facet are displayed. If the user wants to look at LCD TVs, the user selects the "LCD" facet. If the user then wants to look at the OLED TVs, the user may simply remove the "LCD" facet and add the "OLED" facet. All of this may generally be accomplished without an additional search. In this way, the user may efficiently, and interactively, work with the search results.

Although facets may be helpful, they are generally limited to aspects, or dimensions, of the data already returned as part of a search result. What is missing is a convenient way to extend the facet interaction dynamics to include facets from elements that may not be in the search results, or that may not be suggested by the initial search results, and bringing these to the fore as suggestions for the user to select. Described herein are techniques and systems for facet expansion. The facet expansion takes the form of a user interface suggestion element from which the additional facets may be selected by the user and added to the search results. The suggestions take ques from a context including previous facet selections. Thus, the user experience is not interrupted by a new interface, and yet the power of the interface is increased.

The suggestions e.g., either displayed or in a type-ahead when adding facets) are pulled from similar entities. As used herein, an entity is an individual option in a given category. Thus, two job titles, "software engineer" and "software developer" are different entities in the "job title" category. In an example, entities are aspects of social media profiles, however, other record types, such as a product listing, asset record, etc., would have analogous elements as entities. The profiles include other data of specific entities, such as location, skills, etc. Entities may be collected in peer groups. Entities in these peer groups that are not represented in the facet user interface element may be added, resulting in an expanded facet selection than previously available.

Entity grouping into peer groups may be based on a closeness metric of attributes in an entity. Although a certain affinity between entities is necessary to collect them into a peer group, benefits may be had in promoting the differences between those groups. Thus, if the term "software developer" is used in California, and "software engineer" is used in New York, but otherwise these titles refer to the same job, a location suggestion of "California" may be provided even though the entity "software developer" was entered as a facet.

Peer group identification is a statistical analysis based on the attributes of the entities. The analysis both determines the commonality and novelty (e.g., differences) between entities in a pairwise fashion. Peer group affiliation may be used to weight entity attribute for suggestions. Thus, two entities that are poorly related will provide attribute suggestions with a low weight. Entity suggestions may also be weighted by the order in which a facet was entered. This example provides for the user to maintain a train of thought while selecting facets. For example, if skills "Java" and "Html" are entered, in order, as skills facets, all else being equal, the skills suggestions that are based on the "Html" facet will receive priority over those of the "Java" attribute. Rank may also be based on the user. For example, a location may be inferred based on the location of the person performing the search.

Thus, facet expansion may include identifying peer entities, estimating an affinity (e.g., overlap) between the peer entities, ranking attributes of entities in the peer group, and presenting high ranking entities to the user as, for example, facet-entry type-ahead or instant add suggestions.

Search query comes from two sources: member features and similar features. Both sources have explicit features and latent features. The output should be a feature value and relevant score for each facet/dimension.

Figure 1:
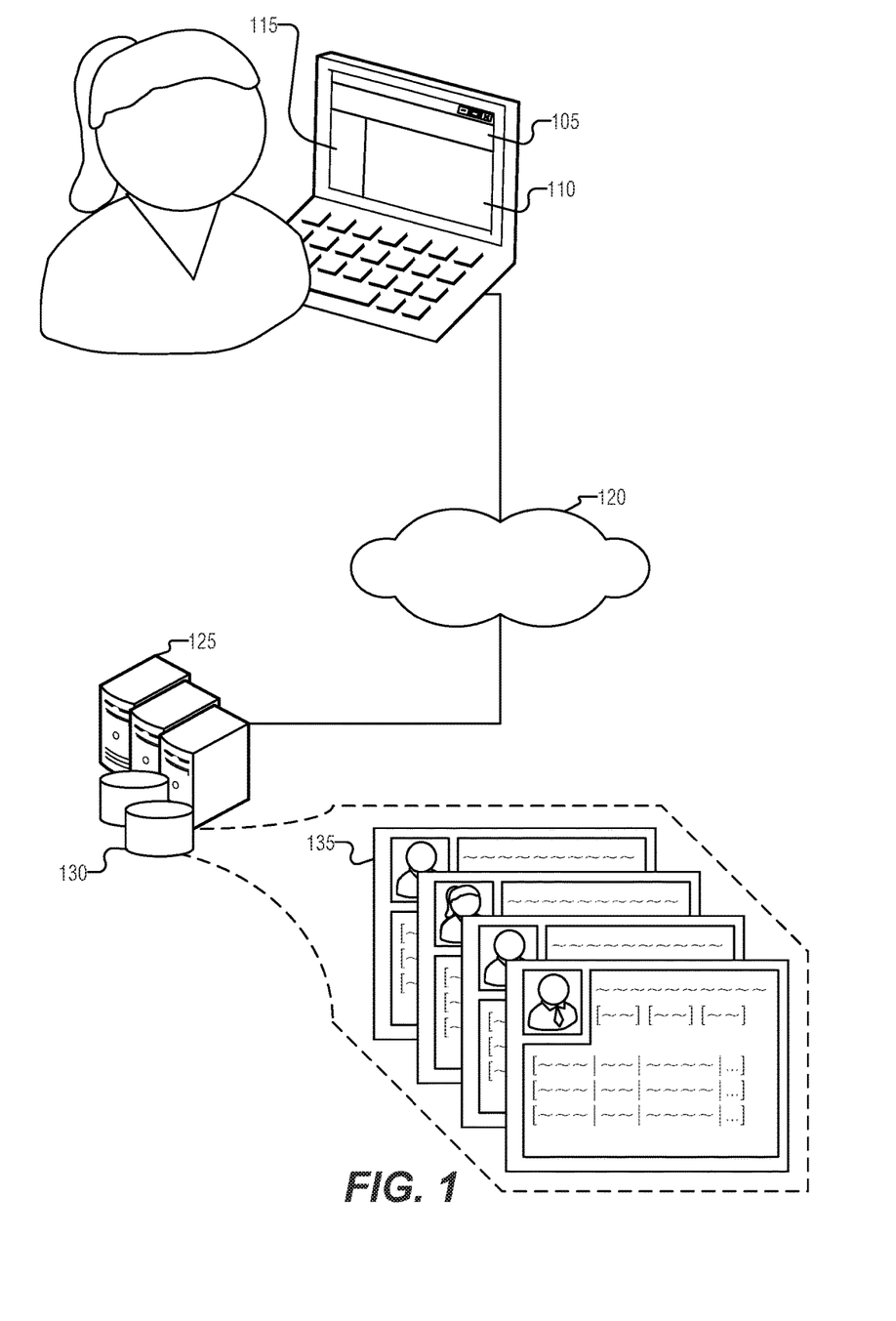
FIG. 1 illustrates an example of a system for facet expansion, according to an embodiment.

FIG. 1 illustrates an example of a system 125 for facet expansion, according to an embodiment. The system 125, when in operation, is communicatively coupled to a network 120 and a data store 130. The network 120 permits the system 125 to communicate a user interface and receive user input from a user device, such as a laptop, tablet, smart phone, etc. As illustrated, the user interface is a search interface that includes a top rail 105, a side rail 115, and a results area 110. The data store 130 contains records 135, here illustrated as candidate records for possible employees. While the example of a recruiter searching for candidates is used throughout this document, other types of records and searches similar benefit from the systems and techniques discussed herein.

The components of the system 125 are implemented in computer hardware, such as with memory, storage (e.g., tape, platter-based hard drives, etc.), transceivers, search engines, query interfaces, filters, circuits, etc., that may be configured by software for a particular operation. As a convenience, the operations of the system 125 will be described with two components, a query interface and a filter.

The query interface discussed herein primarily controls the left rail 115 after search results are displayed in the search results area 110. While this is a typical configuration, it is not required. The query interface is arranged to present a user interface element on a facet selection portion of a search result display including search results. Here, the user interface element is arranged to accept user input of a facet. An example of this interface is presented below in FIG. 3. The user interface element may take the form of an instant add selection below already selected facets, denoted by a pill. The user interface element may also include a type-ahead text area activated by, for example, a "+" element.

The query interface is arranged to receive partial user input for a facet. This is typically achieved through a type-ahead in which the user begins to enter the desired facet. In an example, the partial user input may be received through an instant add of a facet portion. For example, instead of providing a complete facet for instant addition to the set of selected facets, the instant add may include a partial facet that matches several present entities.

The filter is arranged to obtain a peer entity to an entity corresponding to the facet (e.g., that was partially or fully selected by the user). In an example, the peer entity is selected based on a search flow that produced the search results. Search flows are directed searches such that, for example, a guided search starting with the name of a position is different than a keyword search or a search-by-example of an ideal candidate. The search flow may suggest which attributes between entities are used for a closeness measurement. For example, when searching for an ideal candidate, attributes corresponding to the person, and not necessarily a job title, may be emphasized. Similarly, for a position search, the qualifications for the position may be emphasized over, for example, the company that offers a given position.

In an example, the filter is arranged to select the peer entity based on an entity class of the entity. Entity classes, or categories, denote the type of entity rather than the value it contains. Thus, for example, a vehicle record may include a "make" entity with a value that is different than the "make" entity for another vehicle record. As noted above, entities themselves may have more than one attribute. Thus, a job title may also include a qualifications set, a geographical use field, etc. As noted above, comparing these attributes between entities ultimately lead to the selection of facets as suggestions to the user.

Figure 3:
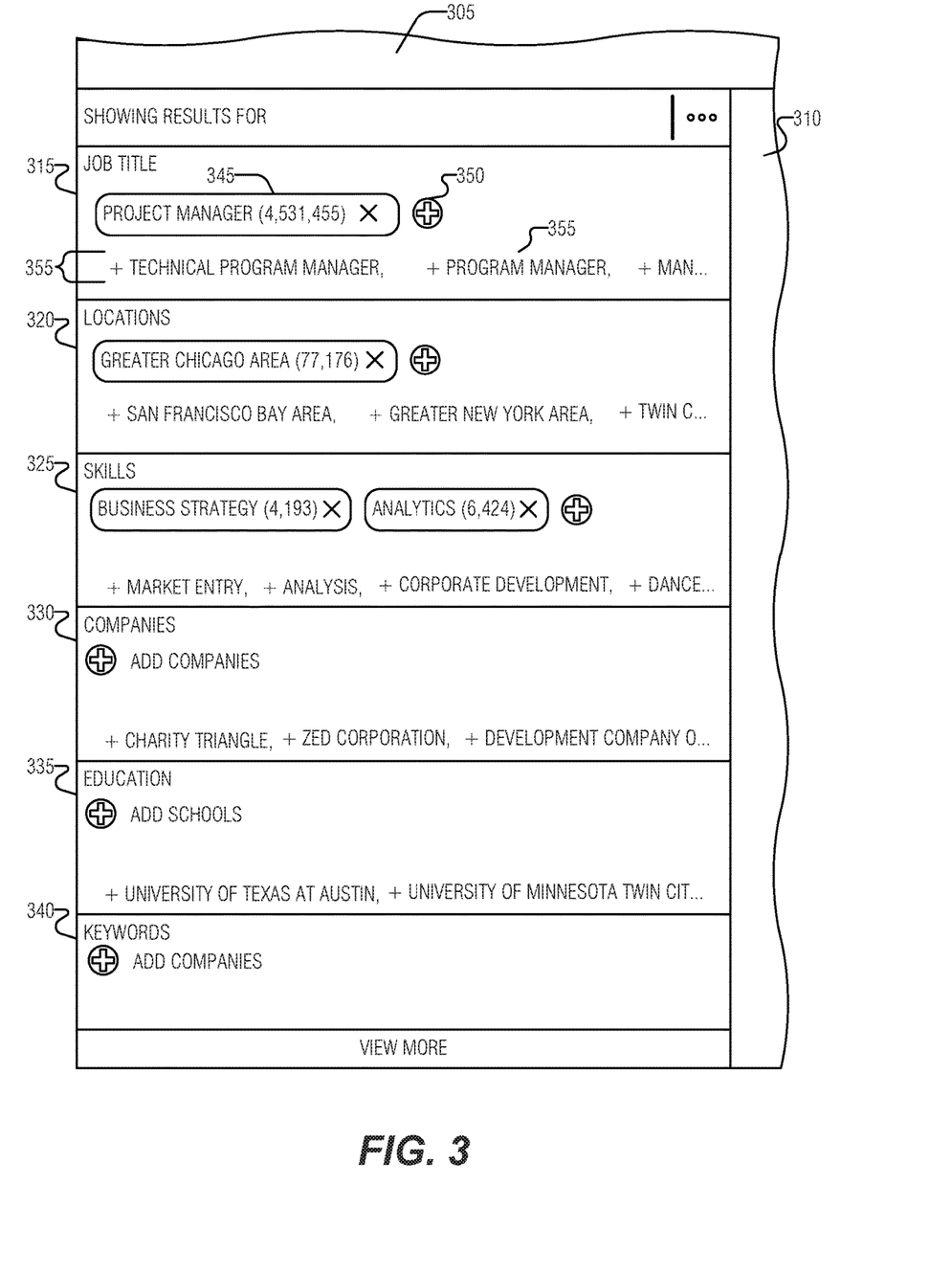
FIG. 3 illustrates an example of a user interface for facet expansion, according to an embodiment.

In an example, the user interface element corresponds to the entity class. Here, facets of a single entity class are displayed together in the facet selection portion by the query interface. This is illustrated in FIG. 3. In an example, the peer entity is selected by the filter based on an entity type of the entity. Thus, if the entity identified by the user's partial facet input is in a first class, the peer group is limited to that entity class.

In an example, the peer entity has a different entity type than that of the entity. This cross class suggestion provides a powerful enhancement over additional facet systems. That is, rather than limit facet suggestion to a class already engaged in by the user, such as job title, the user prompted to add a facet in a different class, such as location. Although additional searching is not required, the effect is as if an expanded search is performed because the user may not have otherwise connected the facet selection of a first class to the suggestion from the second class. For example, say a user is looking to fill a position with a given job title. The facets present in the results indicate a previous employer that the user in interested in, for example, because other hires from that employer have worked well. The filter obtains the company facet identification and entity corresponding to that facet. The entity includes an education set of institutions of candidates that have been hired. These attributes are compared to education institutions and a ranked set of these institution entities is identified. A predetermined number (e.g., one to five) of these institutions may be presented to the user. The user may select that institution and, even if there are not that many candidates from the company available to hire, end up with a facet filter of likely good candidates.

In an example, the peer entity is one of a plurality of peer entities presented in the suggestion element. That is, as noted above, the suggestion may include more than one suggestion to the user. In an example, the plurality of peer entities are ordered in the suggestion element. In an example, the order is based on a closeness measure between the entity and the peer entities. Thus, the greater affinity between the already selected entities and the suggestions, the suggestions are more likely to have a prominent, or any, representation in the suggestion element. In an example, the order is changed based on a previously selected peer facet. Thus, as the user expresses a train of inquiry, the most recently selected facet represents the user's train of thought. Thus, the closeness ordering is not absolute, but rather changed based on what was selected last.

In an example, to obtain the peer entity, the filter is arranged to search for entities based on an attribute of the entity and score a closeness between the entities. In an example, to score the closeness, the filter is arranged to measure an overlap between attributes of the entity and peer entity. In an example, an equal overlap between the entity and a first peer entity is closer to the entity than a second peer entity when the deviation is greater between the entity and the first peer entity. That is, between three entities, the first two are closer than the first is to the third when the number of attributes between the first and second entities that are equivalent e.g., equal, synonyms, within a threshold, etc.) are greater in number than the number of attributes that are equivalent between the first and the third entities.

In an example, the filter is also arranged to measure a deviation between attributes of the entity and peer entity. This deviation measurement provides a ranking mechanism to suggest perhaps unlikely entities. For example, if between three entities, two entities are essentially the same because they have all equivalent attributes, adding a facet for the second entity doesn't improve the search very much because the results should essentially be the same as those of the first entity. However, one would not expect an entity with completely unrelated attributes to be effective either because this entity is more likely to find records that are the opposite of the wishes of the user expressed in previous selections. Thus, given a closeness threshold—that is, entities in the peer groups being at least close enough to each other as determined by a threshold number of attributes in common—those entities that express additional attributes that are different than the already selected entities may bring the greatest value to the user. Thus, once the threshold attribute in common is met, the closeness metric may be increased if the remaining attributes are different.

The filter is arranged to select the peer entity based on closeness to the entity. Thus, the filter searches for entities like those already indicated by, for example, the search or previously entered partial or complete facets. A closeness score is calculated for these peer entities to the already received user inputs and a subset of peer entities with good closeness scores—a high score may be good in some circumstances and a low score may be good in others; the ultimate selection of high or low is a design choice and not significant to the present system 125—are grouped and delivered to the query interface The query interface is arranged to present a peer facet in a suggestion element in the facet selection portion in response to receiving the partial user input. Here, the suggestions discussed above are offered to the user. The user may select a suggestion and further manipulate the search results, offering a more powerful search manipulator than present systems.

Figure 2:
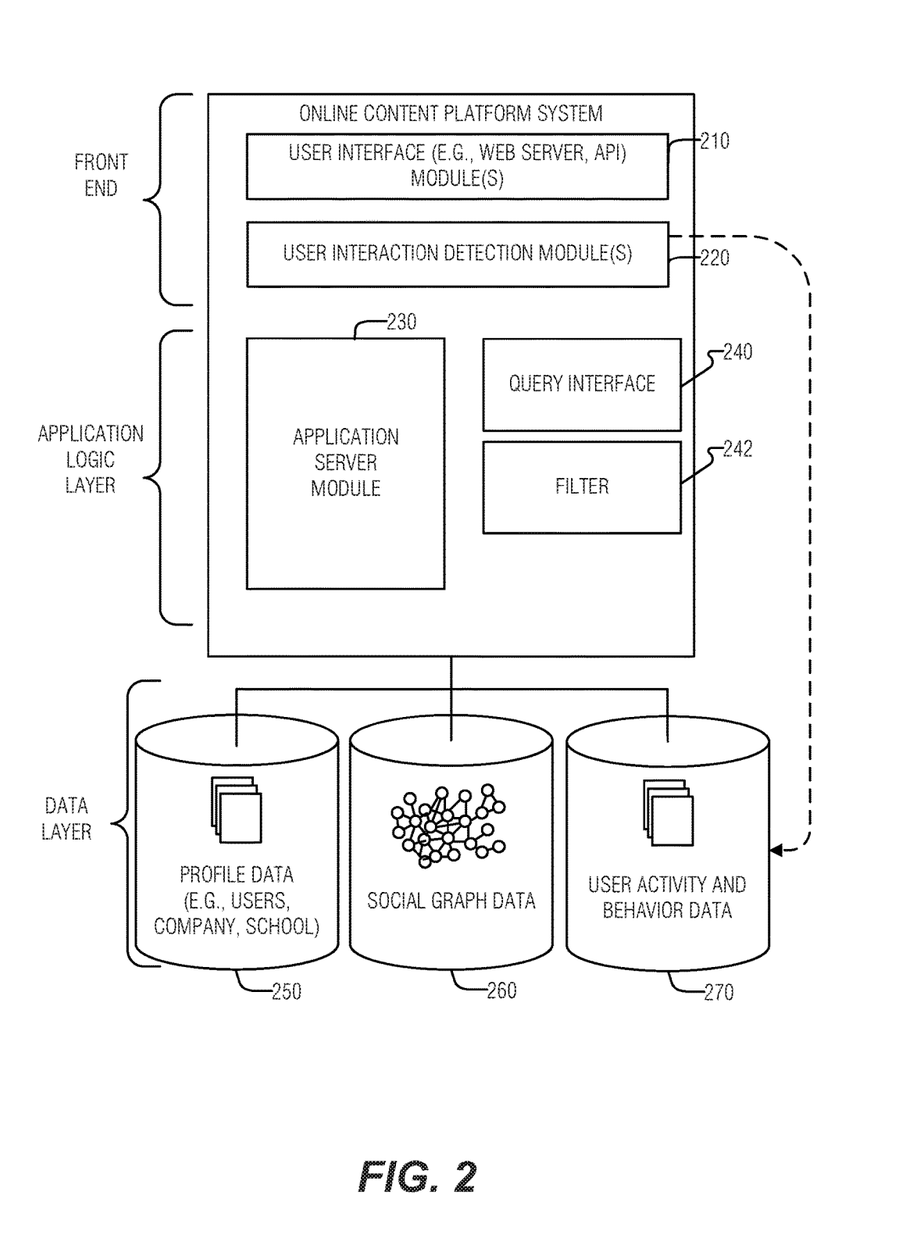
FIG. 2 illustrates the functional components of a social networking service, according to an embodiment.

FIG. 2 illustrates the functional components of a social networking service 200, according to an embodiment. A front end module may comprise a user interface module (e.g., a web server) 220, which receives requests from various client-computing devices, and communicates appropriate responses to the requesting client devices. For example, the user interface module(s) 210 may receive requests in the form of Hypertext Transport Protocol (HTTP) requests, or other network-based, application programming interface (API) requests (e.g., from a dedicated social networking service application running on a client device). In addition, a user interaction and detection module 220 may be provided to detect various interactions that users (e.g., members) have with different applications, services and content presented. Upon detecting a particular interaction, the user interaction and detection module 220 logs the interaction, including the type of interaction and any metadata relating to the interaction, in the member activity and behavior database 270.

An application logic layer may include one or more various application server modules 230, which, in conjunction with the user interface module(s) 210, generate various graphical user interfaces (e.g., web pages) with data retrieved from various data sources in the data layer. With some embodiments, application server module 230 is used to implement the functionality associated with various applications and/or services provided by the social networking service as discussed above.

Application logic layer may also include the query interface 240 and a filter 242. As discussed in FIG. 1, these components facilitate facet expansion.

A data layer may include several databases, such as a database 250 for storing profile data, including both member profile data as well as profile data for various organizations (e.g., companies, schools, etc.). Consistent with some embodiments, when a person initially registers to become a member of the social networking service, the person will be prompted to provide some personal information, such as his or her name, age (e.g., birthdate), gender, interests, contact information, home town, address, the names of the member's spouse and/or family members, educational background (e.g., schools, majors, matriculation and/or graduation dates, etc.), employment history, skills, professional organizations, and so on. This information is stored, for example, in the database 250. Similarly, when a representative of an organization initially registers the organization with the social networking service, the representative may be prompted to provide certain information about the organization. This information may be stored, for example, in the database 250, or another database (not shown). With some embodiments, the profile data may be processed (e.g., in the background or offline) to generate various derived profile data. For example, if a member has provided information about various job titles the member has held with the same company or different companies, and for how long, this information can be used to infer or derive a member profile attribute indicating the member's overall seniority level, or seniority level within a particular company With some embodiments, importing or otherwise accessing data from one or more externally hosted data sources may enhance profile data for both members and organizations. For instance, with companies in particular, financial data may be imported from one or more external data sources, and made part of a company's profile.

Information describing the various associations and relationships, such as connections that the members establish with other members, or with other entities and objects, is stored and maintained within a social graph in the social graph database 260. Also, as members interact with the various applications, services, and content made available via the social networking service, the members' interactions and behavior (e.g., content viewed, links or buttons selected, messages responded to, etc.) may be tracked and information concerning the member's activities and behavior may be logged or stored, for example by the member activity and behavior database 270.

With some embodiments, the social networking service 200 provides an application programming interface (API) module with the user interface module 210 via which applications and services can access various data and services provided or maintained by the social networking service. For example, using an API, an application may be able to request and/or receive one or more navigation recommendations. Such applications may be browser-based applications, or may be operating system-specific. In particular, some applications may reside and execute (at least partially) on one or more mobile devices (e.g., phone, or tablet computing devices) with a mobile operating system. Furthermore, while in many cases the applications or services that leverage the API may be applications and services that are developed and maintained by the entity operating the social networking service, other than data privacy concerns, nothing prevents the API from being provided to the public or to certain third-parties under special arrangements, thereby making the navigation recommendations available to third party applications and services.

FIG. 3 illustrates an example of a user interface for facet expansion, according to an embodiment. The top rail 305 and search result area 310 generally correspond to the similarly named elements discussed above in FIG. 1. The generally illustrated side rail includes entity class grouped facet areas 315, 320, 325, 330, 335, and 340. The pill 345 illustrates an already selected facet for "PROJECT MANAGER." The user interface element 350 is an example element that may display a type-ahead element. The type-ahead element includes a text entry as well as a changing list of suggestions based on the partially entered data in the text entry. The instant add area 355 is here displayed for each class.

As noted above, the facet selection element may take the form of the instant add area 355. Thus, as facets are added, or typed into the type-ahead, the instant add selections will change.

Figure 4:
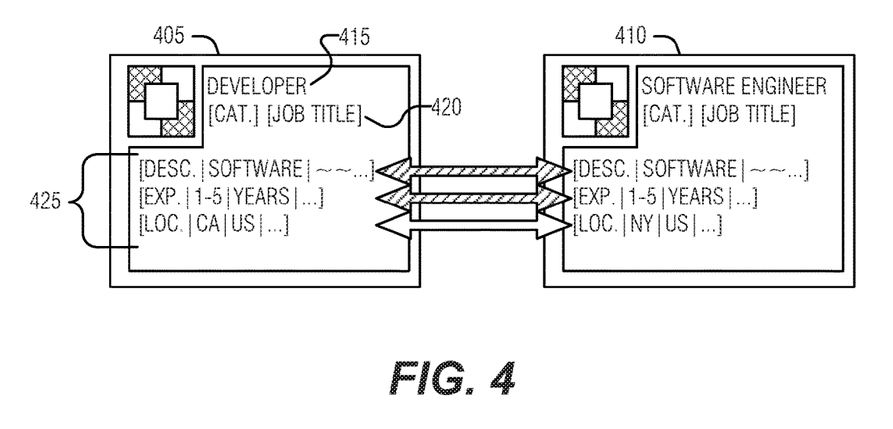
FIG. 4 illustrates an example of entity comparison for facet expansion, according to an embodiment.

FIG. 4 illustrates an example of entity comparison for facet expansion, according to an embodiment. The entities 405 and 410 include a number of attributes 425, different entity values 415 but the same category 420 (e.g., "JOB TITLE"). The shaded arrows between the entities 405 and 410 denote those attribute that are equivalent with the unshaded arrow denotes a different (e.g., not equivalent) attribute. As noted above, the closeness metric may be bettered (e.g., increased) when a threshold similarity is met (here two attributes) and a dissimilarly is present. Thus, in the illustrated example, not only could "SOFTWARE ENGINEER" be offered as a facet suggestion, but a location of "NY, US" as a location facet.

Figure 5:
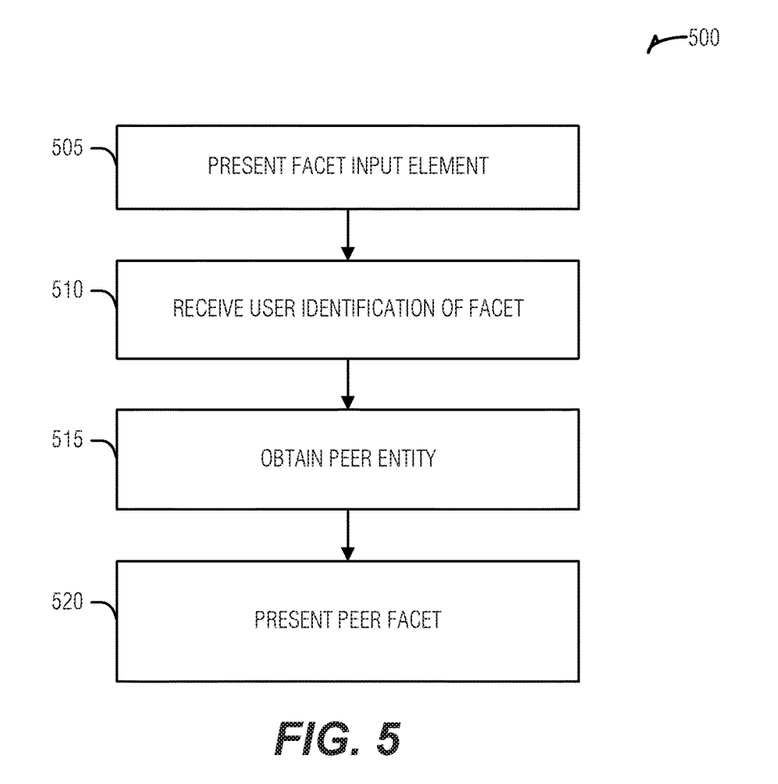
FIG. 5 illustrates an example of a method for facet expansion, according to an embodiment.

FIG. 5 illustrates an example of a method 500 for facet expansion, according to an embodiment. Operations of the method 500 are preformed using computer hardware, such as processors, memory, or circuitry, as described below with respect to FIG. 6.

At operation 505, a user interface element is presented on a facet selection portion of a search result display including search results. Here, the user interface element is arranged to accept user input of a facet.

At operation 510, partial user input is received for a facet.

At operation 515, a peer entity to an entity corresponding to the facet is obtained. In an example the peer entity is selected based on a search flow that produced the search results.

In an example the peer entity is selected based on an entity class of the entity. In an example the user interface element corresponds to the entity class. Here, facets of a single entity class are displayed together in the facet selection portion. In an example the peer entity is selected based on an entity type of the entity. In an example the peer entity has a different entity type than that of the entity.

In an example the peer entity is one of a plurality of peer entities presented in the suggestion element. In an example the plurality of peer entities are ordered in the suggestion element. In an example the order is based on a closeness measure between the entity and the peer entities. In an example the order is changed based on a previously selected peer facet.

In an example, obtaining the peer entity includes searching for entities based on an attribute of the entity and scoring closeness between the entities. In an example scoring the closeness includes measuring an overlap between attributes of the entity and peer entity. In an example an equal overlap between the entity and a first peer entity is closer to the entity than a second peer entity when the deviation is greater between the entity and the first peer entity. In an example scoring the closeness also includes measuring a deviation between attributes of the entity and peer entity as well as selecting the peer entity based on closeness to the entity.

At operation 520, a peer facet is presented in a suggestion element in the facet selection portion in response to receiving the partial user input.

Figure 6:
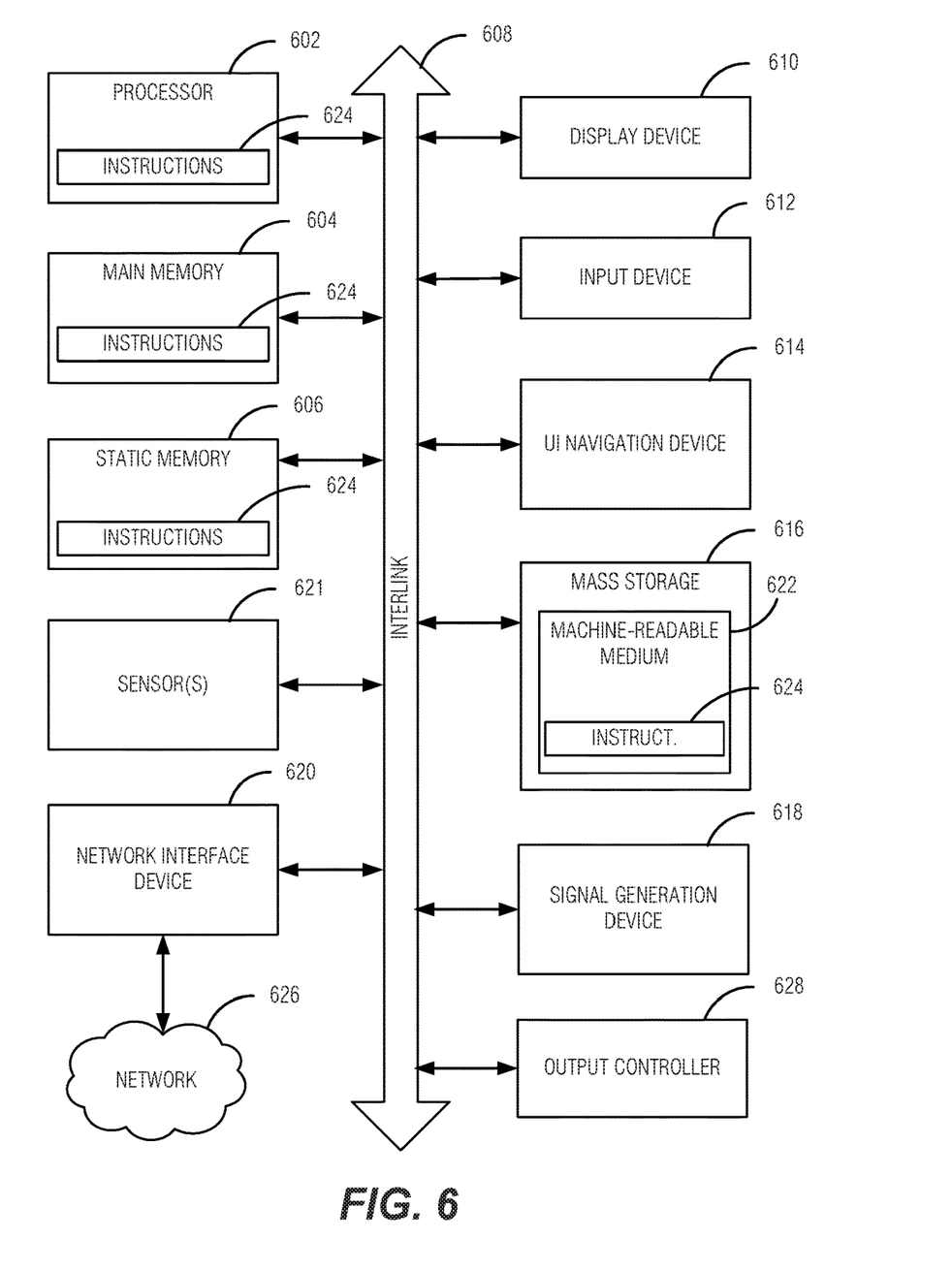
FIG. 6 is a block diagram illustrating an example of a machine upon which one or more embodiments may be implemented.

FIG. 6 illustrates a block diagram of an example machine 600 upon which any one or more of the techniques (e.g., methodologies) discussed herein may perform. In alternative embodiments, the machine 600 may operate as a standalone device or may be connected (e.g., networked) to other machines. In a networked deployment, the machine 600 may operate in the capacity of a server machine, a client machine, or both in server-client network environments. In an example, the machine 600 may act as a peer machine in peer-to-peer (P2P) (or other distributed) network environment. The machine 600 may be a personal computer (PC), a tablet PC, a set-top box (STB), a personal digital assistant (PDA), a mobile telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

Examples, as described herein, may include, or may operate by, logic or a number of components, or mechanisms. Circuitry is a collection of circuits implemented in tangible entities that include hardware (e.g., simple circuits, gates, logic, etc.). Circuitry membership may be flexible over time and underlying hardware variability. Circuitries include members that may, alone or in combination, perform specified operations when operating. In an example, hardware of the circuitry may be immutably designed to carry out a specific operation (e.g., hardwired). In an example, the hardware of the circuitry may include variably connected physical components (e.g., execution units, transistors, simple circuits, etc.) including a computer readable medium physically modified (e.g., magnetically, electrically, moveable placement of invariant massed particles, etc.) to encode instructions of the specific operation. In connecting the physical components, the underlying electrical properties of a hardware constituent are changed, for example, from an insulator to a conductor or vice versa. The instructions enable embedded hardware (e.g., the execution units or a loading mechanism) to create members of the circuitry in hardware via the variable connections to carry out portions of the specific operation when in operation. Accordingly, the computer readable medium is communicatively coupled to the other components of the circuitry when the device is operating. In an example, any of the physical components may be used in more than one member of more than one circuitry. For example, under operation, execution units may be used in a first circuit of a first circuitry at one point in time and reused by a second circuit in the first circuitry, or by a third circuit in a second circuitry at a different time.

Machine (e.g., computer system) 600 may include a hardware processor 602 (e.g., a central processing unit (CPU), a graphics processing unit (GPU), a hardware processor core, or any combination thereof), a main memory 604 and a static memory 606, some or all of which may communicate with each other via an interlink (e.g., bus) 608. The machine 600 may further include a display unit 610, an alphanumeric input device 612 (e.g., a keyboard), and a user interface (UI) navigation device 614 (e.g., a mouse). In an example, the display unit 610, input device 612 and UI navigation device 614 may be a touch screen display. The machine 600 may additionally include a storage device (e.g., drive unit) 616, a signal generation device 618 (e.g., a speaker), a network interface device 620, and one or more sensors 621, such as a global positioning system (GPS) sensor, compass, accelerometer, or other sensor. The machine 600 may include an output controller 628, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

The storage device 616 may include a machine readable medium 622 on which is stored one or more sets of data structures or instructions 624 (e.g., software) embodying or utilized by any one or more of the techniques or functions described herein. The instructions 624 may also reside, completely or at least partially, within the main memory 604, within static memory 606, or within the hardware processor 602 during execution thereof by the machine 600. In an example, one or any combination of the hardware processor 602, the main memory 604, the static memory 606, or the storage device 616 may constitute machine readable media.

While the machine readable medium 622 is illustrated as a single medium, the term "machine readable medium" may include a single medium or multiple media (e.g., a centralized or distributed database, and/or associated caches and servers) configured to store the one or more instructions 624.

The term "machine readable medium" may include any medium that is capable of storing, encoding, or carrying instructions for execution by the machine 600 and that cause the machine 600 to perform any one or more of the techniques of the present disclosure, or that is capable of storing, encoding or carrying data structures used by or associated with such instructions. Non-limiting machine readable medium examples may include solid-state memories, and optical and magnetic media. In an example, a massed machine readable medium comprises a machine readable medium with a plurality of particles having invariant (e.g., rest) mass. Accordingly, massed machine-readable media are not transitory propagating signals. Specific examples of massed machine readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; and CD-ROM and DVD-ROM disks.

The instructions 624 may further be transmitted or received over a communications network 626 using a transmission medium via the network interface device 620 utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as Wi-Fi®, IEEE 802.16 family of standards known as WiMAX®), IEEE 802.15.4 family of standards, peer-to-peer (P2P) networks, among others. In an example, the network interface device 620 may include one or more physical jacks (e.g., Ethernet, coaxial, or phone jacks) or one or more antennas to connect to the communications network 626. In an example, the network interface device 620 may include a plurality of antennas to wirelessly communicate using at least one of single-input multiple-output (SIMO), multiple-input multiple-output (MIMO) or multiple-input single-output (MISO) techniques. The term "transmission medium" shall be taken to include any intangible medium that is capable of storing, encoding or carrying instructions for execution by the machine 600, and includes digital or analog communications signals or other intangible medium to facilitate communication of such software.

Additional Notes & Examples

Example 1 is a system for facet expansion, the system comprising: a processor; and a memory including instructions that, when executed by the processor, cause the processor to: present a user interface element on facet selection portion of a search result display including search results, the user interface element arranged to accept user input of a facet; receive partial user input for a facet; obtain a peer entity to an entity corresponding to the facet; present a peer facet in a suggestion element in the facet selection portion in response to receiving the partial user input.

In Example 2, the subject matter of Example 1 optionally includes wherein the peer entity is selected based on a search flow that produced the search results.

In Example 3, the subject matter of any one or more of Examples 1-2 optionally include wherein the peer entity is selected based on an entity class of the entity.

In Example 4, the subject matter of Example 3 optionally includes wherein the user interface element corresponds to the entity class, facets of a single entity class being displayed together in the facet selection portion.

In Example 5, the subject matter of any one or more of Examples 3-4 optionally include wherein the peer entity is selected based on an entity type of the entity.

In Example 6, the subject matter of Example 5 optionally includes wherein the peer entity has a different entity type than that of the entity.

In Example 7, the subject matter of any one or more of Examples 1-6 optionally include wherein the peer entity is one of a plurality of peer entities presented in the suggestion element.

In Example 8, the subject matter of Example 7 optionally includes wherein the plurality of peer entities is ordered in the suggestion element.

In Example 9, the subject matter of Example 8 optionally includes wherein the order is based on a closeness measure between the entity and the peer entities.

In Example 10, the subject matter of Example 9 optionally includes wherein the order is changed based on a previously selected peer facet.

In Example 11, the subject matter of any one or more of Examples 1-10 optionally include wherein to obtain the peer entity includes the processor to: search for entities based on an attribute of the entity; score closeness between the entities; and select the peer entity based on closeness to the entity.

In Example 12, the subject matter of Example 11 optionally includes wherein to score the closeness includes the processor to: measure an overlap between attributes of the entity and peer entity; and measure a deviation between attributes of the entity and peer entity.

In Example 13, the subject matter of Example 12 optionally includes wherein an equal overlap between the entity and a first peer entity is closer to the entity than a second peer entity when the deviation is greater between the entity and the first peer entity.

Example 14 is a method for facet expansion, the method comprising: presenting a user interface element on facet selection portion of a search result display including search results, the user interface element arranged to accept user input of a facet; receiving partial user input for a facet; obtaining a peer entity to an entity corresponding to the facet; presenting a peer facet in a suggestion element in the facet selection portion in response to receiving the partial user input.

In Example 15, the subject matter of Example 14 optionally includes wherein the peer entity is selected based on a search flow that produced the search results.

In Example 16, the subject matter of any one or more of Examples 14-15 optionally include wherein the peer entity is selected based on an entity class of the entity.

In Example 17, the subject matter of Example 16 optionally includes wherein the user interface element corresponds to the entity class, facets of a single entity class being displayed together in the facet selection portion.

In Example 18, the subject matter of any one or more of Examples 16-17 optionally include wherein the peer entity is selected based on an entity type of the entity.

In Example 19, the subject matter of Example 18 optionally includes wherein the peer entity has a different entity type than that of the entity.

In Example 20, the subject matter of any one or more of Examples 14-19 optionally include wherein the peer entity is one of a plurality of peer entities presented in the suggestion element.

In Example 21, the subject matter of Example 20 optionally includes wherein the plurality of peer entities is ordered in the suggestion element.

In Example 22, the subject matter of Example 21 optionally includes wherein the order is based on a closeness measure between the entity and the peer entities.

In Example 23, the subject matter of Example 22 optionally includes wherein the order is changed based on a previously selected peer facet.

In Example 24, the subject matter of any one or more of Examples 14-23 optionally include wherein obtaining the peer entity includes: searching for entities based on an attribute of the entity; scoring closeness between the entities; and selecting the peer entity based on closeness to the entity.

In Example 25, the subject matter of Example 24 optionally includes wherein scoring the closeness includes: measuring an overlap between attributes of the entity and peer entity; and measuring a deviation between attributes of the entity and peer entity.

In Example 26, the subject matter of Example 25 optionally includes wherein an equal overlap between the entity and a first peer entity is closer to the entity than a second peer entity when the deviation is greater between the entity and the first peer entity.

Example 27 is a non-transitory machine readable medium including instructions that, when executed by a machine, cause the machine to: present a user interface element on facet selection portion of a search result display including search results, the user interface element arranged to accept user input of a facet; receive partial user input for a facet; obtain a peer entity to an entity corresponding to the facet; present a peer facet in a suggestion element in the facet selection portion in response to receiving the partial user input.

In Example 28, the subject matter of Example 27 optionally includes wherein the peer entity is selected based on a search flow that produced the search results.

In Example 29, the subject matter of any one or more of Examples 27-28 optionally include wherein the peer entity is selected based on an entity class of the entity.

In Example 30, the subject matter of Example 29 optionally includes wherein the user interface element corresponds to the entity class, facets of a single entity class being displayed together in the facet selection portion.

In Example 31, the subject matter of any one or more of Examples 29-30 optionally include wherein the peer entity is selected based on an entity type of the entity.

In Example 32, the subject matter of Example 31 optionally includes wherein the peer entity has a different entity type than that of the entity.

In Example 33, the subject matter of any one or more of Examples 27-32 optionally include wherein the peer entity is one of a plurality of peer entities presented in the suggestion element.

In Example 34, the subject matter of Example 33 optionally includes wherein the plurality of peer entities is ordered in the suggestion element.

In Example 35, the subject matter of Example 34 optionally includes wherein the order is based on a closeness measure between the entity and the peer entities.

In Example 36, the subject matter of Example 35 optional y includes wherein the order is changed based on a previously selected peer facet.

In Example 37, the subject matter of any one or more of Examples 27-36 optionally include wherein to obtain the peer entity includes the machine to: search for entities based on an attribute of the entity; score closeness between the entities; and select the peer entity based on closeness to the entity.

In Example 38, the subject matter of Example 37 optionally includes wherein to score the closeness includes the machine to: measure an overlap between attributes of the entity and peer entity; and measure a deviation between attributes of the entity and peer entity.

In Example 39, the subject matter of Example 38 optionally includes wherein an equal overlap between the entity and a first peer entity is closer to the entity than a second peer entity when the deviation is greater between the entity and the first peer entity.

Example 40 is a method comprising: present search results on an area of a display; placing a filter area on the display, the filter area including a plurality of facets of the search results, a graphical element for each facet including a graphical element representing the facet and a recommendation for an additional facet; receiving a user entry modifying the facets; and adjusting the search results based on the modified facets.

In Example 41, the subject matter of Example 40 optionally includes wherein facets in the filter area are grouped by categories.

In Example 42, the subject matter of Example 41 optionally includes wherein the recommendation for an additional facet is constrained to the category of the individual facet.

In Example 43, the subject matter of any one or more of Examples 40-42 optionally include wherein modifying the facets includes at least on of removing a facet, changing the value of a facet, or adding a facet.

In Example 44, the subject matter of any one or more of Examples 40-43 optionally include wherein adjusting the search results includes removing search results that do not match an added facet.

In Example 45, the subject matter of any one or more of Examples 40-44 optionally include wherein adjusting the search results includes running a second search to produce new search results based on the modified facets.

Example 46 is a system comprising: a user interface module to: present search results on an area of a display; and place a filter area on the display, the filter area including a plurality of facets of the search results, a graphical element for each facet including a graphical element representing the facet and a recommendation for an additional facet; and a filter module to: receive a user entry modifying the facets; and adjust the search results based on the modified facets.

In Example 47, the subject matter of Example 46 optionally includes wherein facets in the filter area are grouped by categories.

In Example 48, the subject matter of Example 47 optionally includes wherein the recommendation for an additional facet is constrained to the category of the individual facet.

In Example 49, the subject matter of any one or more of Examples 46-48 optionally include wherein modifying the facets includes at least on of removing a facet, changing the value of a facet, or adding a facet.

In Example 50, the subject matter of any one or more of Examples 46-49 optionally include wherein to adjust the search results includes the filter module to remove search results that do not match an added facet.

In Example 51, the subject matter of any one or more of Examples 46-50 optionally include wherein to adjust the search results includes a query engine to run a second search to produce new search results based on the modified facets.

The above detailed description includes references to the accompanying drawings, which form a part of the detailed description. The drawings show, by way of illustration, specific embodiments that may be practiced. These embodiments are also referred to herein as "examples," Such examples may include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

All publications, patents, and patent documents referred to in this document are incorporated by reference herein in their entirety, as though individually incorporated by reference. In the event of inconsistent usages between this document and those documents so incorporated by reference, the usage in the incorporated reference(s) should be considered supplementary to that of this document; for irreconcilable inconsistencies, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

The above description is intended to be illustrative, and not restrictive. For example, the above-described examples (or one or more aspects thereof may be used in combination with each other. Other embodiments may be used, such as by one of ordinary skill in the art upon reviewing the above description. The Abstract is to allow the reader to quickly ascertain the nature of the technical disclosure and is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description, with each claim standing on its own as a separate embodiment. The scope of the embodiments should be determined with reference to the appended claims, along with the full scope of equivalents to which such claims are entitled.

What is claimed is:

1. A system for facet expansion, the system comprising:
a processor; and
a memory including instructions that, when executed by the processor, cause the processor to:
present a user interface element on a facet selection portion of a search result display including search results, the user interface element arranged to accept user input of a facet;
receive partial user input for a facet;
obtain a peer entity to an entity corresponding to the facet, the peer entity obtained from an entity class of the entity corresponding to the facet by:
searching for peer entities based on an attribute of the entity corresponding to the facet;
scoring closeness between the entity corresponding to the facet and each peer entity returned from the searching; and
selecting the peer entity based on closeness of the peer entity to the entity corresponding to the facet; and
present a peer facet in a suggestion element in the facet selection portion in response to receiving the partial user input.

2. The system of claim 1, wherein the peer entity is one of a plurality of peer entities presented in the suggestion element.

3. The system of claim 2, wherein the plurality of peer entities is ordered in the suggestion element.

4. The system of claim 3, wherein the order is based on a closeness measure between the entity and the peer entities.

5. The system of claim 1, wherein to score the closeness includes the processor to:
   measure an overlap between attributes of the entity and peer entity; and
   measure a deviation between attributes of the entity and peer entity.

6. A method for facet expansion, the method comprising:
   presenting a user interface element on a facet selection portion of a search result display including search results, the user interface element arranged to accept user input of a facet;
   receiving partial user input for a facet;
   obtaining a peer entity to an entity corresponding to the facet, the peer entity obtained from an entity class of the entity corresponding to the facet by:
      searching for peer entities based on an attribute of the entity corresponding to the facet;
      scoring closeness between the entity corresponding to the facet and each peer entity returned from the searching; and
      selecting the peer entity based on closeness of the peer entity to the entity corresponding to the facet; and
   presenting a peer facet in a suggestion element in the facet selection portion in response to receiving the partial user input.

7. The method of claim 6, wherein the peer entity is one of a plurality of peer entities presented in the suggestion element.

8. The method of claim 7, wherein the plurality of peer entities is ordered in the suggestion element.

9. The method of claim 8, wherein the order is based on a closeness measure between the entity and the peer entities.

10. The method of claim 6, wherein scoring the closeness includes:
    measuring an overlap between attributes of the entity and peer entity; and
    measuring a deviation between attributes of the entity and peer entity.

11. A non-transitory machine readable medium including instructions that, when executed by a machine, cause the machine to:
    present a user interface element on a facet selection portion of a search result display including search results, the user interface element arranged to accept user input of a facet;
    receive partial user input for a facet;
    obtain a peer entity to an entity corresponding to the facet, the peer entity obtained from an entity class of the entity corresponding to the facet by:
       searching for peer entities based on an attribute of the entity corresponding to the facet;
       scoring closeness between the entity corresponding to the facet and each peer entity returned from the searching; and
       selecting the peer entity based on closeness of the peer entity to the entity corresponding to the facet; and
    present a peer facet in a suggestion element in the facet selection portion in response to receiving the partial user input.

12. The machine readable medium of claim 11, wherein the peer entity is one of a plurality of peer entities presented in the suggestion element.

13. The machine readable medium of claim 12, wherein the plurality of peer entities is ordered in the suggestion element.

14. The machine readable medium of claim 13, wherein the order is based on a closeness measure between the entity and the peer entities.

15. The machine readable medium of claim 11, wherein to score the closeness includes the machine to:
    measure an overlap between attributes of the entity and peer entity; and
    measure a deviation between attributes of the entity and peer entity.

* * * * *

UNITED STATES PATENT AND TRADEMARK OFFICE
CERTIFICATE OF CORRECTION

Page 1 of 1

PATENT NO.        : 10,409,830 B2
APPLICATION NO.   : 15/253644
DATED             : September 10, 2019
INVENTOR(S)       : Daya et al.

It is certified that error appears in the above-identified patent and that said Letters Patent is hereby corrected as shown below:

In the Claims

In Column 16, Line 3, in Claim 11, delete "Anon-transitory" and insert --A non-transitory-- therefor Signed and Sealed this
Ninth Day of November, 2021

Drew Hirshfeld
*Performing the Functions and Duties of the*
*Under Secretary of Commerce for Intellectual Property and*
*Director of the United States Patent and Trademark Office*